United States Patent [19]

Herchenbach

[11] Patent Number: 5,076,369
[45] Date of Patent: Dec. 31, 1991

[54] LENGTH-ADJUSTABLE UPPER STEERING ARM FOR A THREE-POINT COUPLING DEVICE

[75] Inventor: Paul Herchenbach, Ruppichteroth, Fed. Rep. of Germany

[73] Assignee: Jean Walterscheid GmbH, Lohmar, Fed. Rep. of Germany

[21] Appl. No.: 612,616

[22] Filed: Nov. 13, 1990

[30] Foreign Application Priority Data

Nov. 18, 1989 [DE] Fed. Rep. of Germany ....... 3938419

[51] Int. Cl.$^5$ .................... A01B 59/043; A01B 63/02; B60D 1/42
[52] U.S. Cl. ..................... 172/439; 74/586; 172/679; 403/46; 280/482; 411/205
[58] Field of Search ............... 172/439, 443, 444, 677, 172/679, 734, 776; 74/586; 408/45, 46, 109, 377, 327, 328; 411/348, 354, 205, 216, 217; 280/482

[56] References Cited

U.S. PATENT DOCUMENTS

| | | | |
|---|---|---|---|
| 2,648,997 | 8/1953 | Sawyer | 74/586 |
| 3,731,951 | 5/1973 | Gruenberger | 172/439 |
| 4,126,057 | 11/1978 | von Allwörden et al. | 74/586 |
| 4,146,246 | 3/1979 | Geisthoff | 172/439 |
| 4,295,389 | 10/1981 | Geisthoff et al. | 74/586 |
| 4,418,935 | 12/1983 | O'Connor | 411/217 |
| 4,778,194 | 10/1988 | Koch et al. | 172/448 |

FOREIGN PATENT DOCUMENTS

| | | | |
|---|---|---|---|
| 581698 | 8/1959 | Canada | 172/448 |
| 1403300 | 5/1965 | France | 172/439 |
| 993843 | 2/1983 | U.S.S.R. | 172/439 |
| 1482550 | 5/1989 | U.S.S.R. | 172/439 |

Primary Examiner—Dennis L. Taylor
Assistant Examiner—Spencer Warnick
Attorney, Agent, or Firm—Toren, McGeady & Associates

[57] ABSTRACT

A length-adjustable upper steering arm for a three-point coupling device, including a connecting eye having a threaded shank, and a coupling hook having a threaded shank, both of which are received in threaded bores of a sleeve, and which threads extend in opposite directions. To achieve a locked position or disengaged position of the coupling hook relative to the sleeve, there are provided an actuating lever and a locking ratchet which is partially pivotable independently thereof. Because the spring-loaded locking ratchet may be pivoted from the disengaged position into the engaged position independently of the actuating lever, the thread is not subject to jamming forces.

10 Claims, 3 Drawing Sheets

FIG. I

LENGTH-ADJUSTABLE UPPER STEERING ARM FOR A THREE-POINT COUPLING DEVICE

BACKGROUND OF THE INVENTION

The invention relates to a length-adjustable upper steering arm for a three-point coupling device for connecting agricultural implements to a tractor, having a sleeve whose ends, inside, are provided with threaded bores whose threads extend in opposite directions and into which a connecting eye or coupling hook comprising a threaded shank with a corresponding thread is screwed so as to be adjustable. The sleeve is provided with a pivotable actuating lever via which, for locking purposes, a locking ratchet may be moved through an aperture in the sleeve into a groove of the threaded shank of the connecting eye or coupling hook.

With such a design, the locking ratchet is rigidly connected to an actuating lever and there is a risk that when the steering arm is adjusted by rotating the sleeve or when transferring or looking for the groove for achieving the locking position, the thread subject to locking ratchet loads may be deformed as a result of the application of the manual force because the coinciding positions of the groove and locking ratchet have to be found by trial and error so that even unintentionally force may be applied to the adjoining thread portion.

Such deformation may adversely affect the functioning ability of the adjusting means.

SUMMARY OF THE INVENTION

It is an object of the present invention to provide an upper steering arm in which a threaded shank of one of the two connecting elements, i.e., of the connecting eye or coupling hook, is securely locked automatically without the thread or groove of the threaded shank being likely to be damaged.

Pursuant to this object, and others which will become apparent hereafter, one aspect of the present invention resides in the actuating lever and the locking ratchet being supported at the sleeve so as to be pivotable independently of each other at a free-floating angle. The locking ratchet is loaded by a spring in the direction of the locking position and the actuating lever—via a stop resting against the locking ratchet in the locking position—transfers the locking ratchet into the disengaged position by pivoting through a pivot angle.

The advantage of this design is that the locking ratchet is engaged independently of the operation of the actuating lever when the actuating lever is moved back into the starting position. The locking ratchet is engaged automatically under the force of a spring when the position of the groove of the threaded shank and that of the locking ratchet associated with the sleeve coincide. As the locking ratchet, after having dropped into the groove, again comes to rest against the stop of the actuating lever, the locking ratchet is disengaged immediately as a result of the pivoting movement of the actuating lever. The locking ratchet and actuating lever are moved jointly. Only the movement of the locking ratchet into the locking position takes place independently of the movement of the actuating lever when the latter is returned into its starting position, i.e., the actuating lever may be returned into the starting position without any pivoting on the part of the locking ratchet.

According to a further embodiment of the invention, the angular travel of the free-floating angle corresponds to the pivot angle which the locking ratchet covers from the disengaged position into the locking position.

In still another embodiment, the actuating lever and the locking ratchet are jointly supported in a U-shaped bearing block which is attached to a sleeve.

Particularly advantageous supporting conditions are obtained if, at its end to be supported, the actuating lever is designed to be yoke-like, if the locking ratchet is received between the yoke arms and if these are supported together in a bearing block via a pin.

The spring is preferably designed as a leg spring, one leg of which is supported on the sleeve, with the other spring leg being supported on the locking ratchet.

Particularly advantageous loading conditions are obtained if two springs are provided whose spring legs supported on the locking ratchet are connected to each other, thereby introducing the force symmetrically so that the locking ratchet cannot jam.

The stop is preferably arranged at the inner face of the yoke shank between the two yoke arms. Furthermore, it is proposed to arrange the pivot axes of the actuating lever and of the locking ratchet in such a way as to extend transversely to the longitudinal axis.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
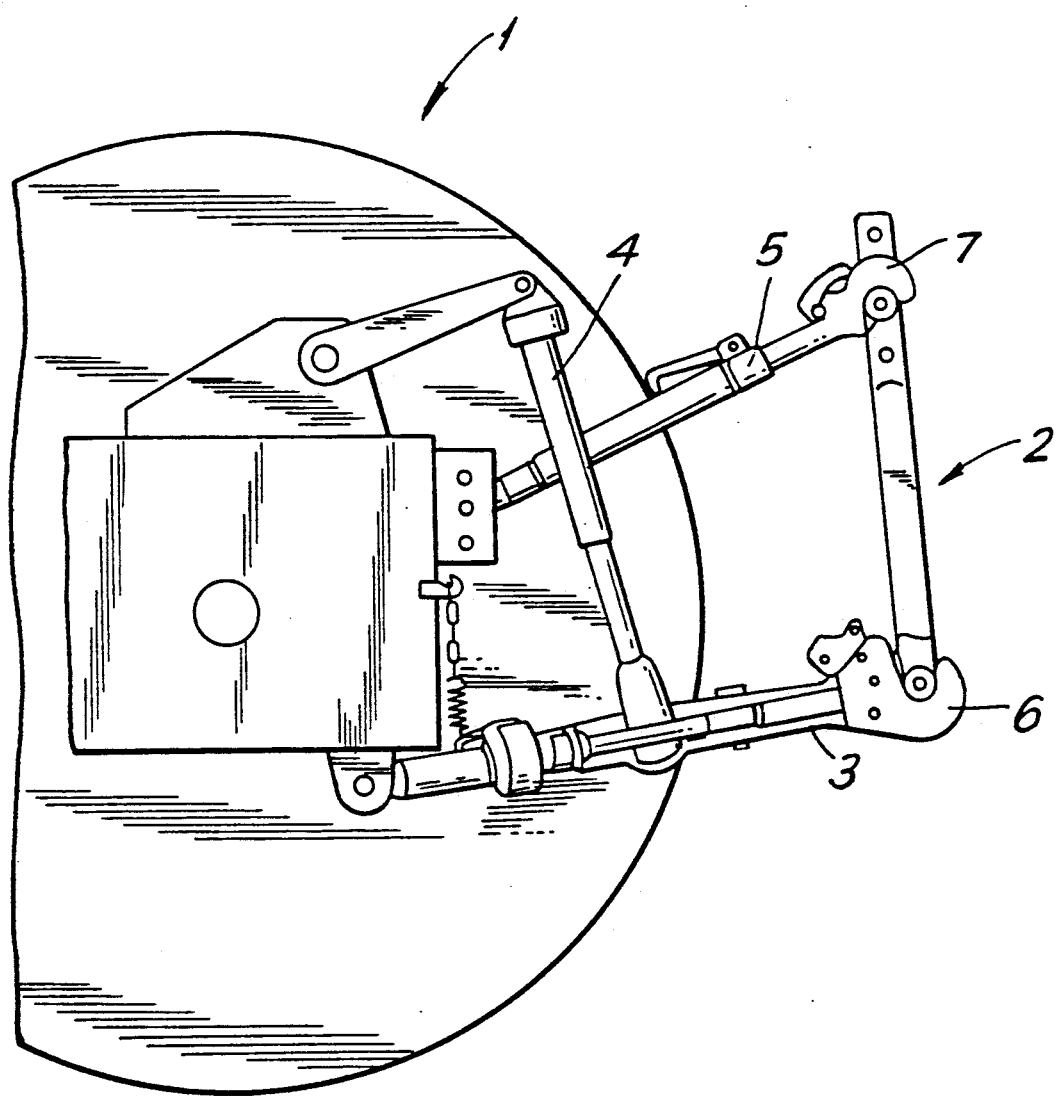
FIG. 1 shows part of the rear end of a tractor having a three-point coupling device.

The rear end of a tractor 1 shown in FIG. 1 is provided with a three-point coupling device 2. The three-point coupling device 2 serves to connect agricultural implements. There are provided two lower steering arms 3 which are arranged relative to the longitudinal axis so as to be offset in parallel. The two lower steering arms 3, via lifting struts 4, are connected to a power drive via which they may be raised and lowered. Above the two lower steering arms 3 and approximately in the region of the longitudinal axis of the tractor 1 there is arranged an upper steering arm 5. The two lower steering arms 3 and the upper steering arm 5 are provided with coupling hooks 6, 7. The coupling hooks 6, 7 serve to secure the implement to be attached.

To be able to align the implement in the required position, the upper steering arm 5 is designed so as to be length-adjustable. The upper steering arm 5 consists of a central sleeve 8 which narrows toward its ends 9, 10. The narrowed ends 9, 10 of the sleeve 8 are provided with threaded bores 11, 12, respectively. The pitches of the two threaded bores 11, 12 extend in opposite directions. A connecting eye 13 having a threaded shank 15 and a coupling hook 7 having a threaded shank 14 are screwed into the ends 9, 10 of the sleeve 8. By rotating the sleeve 8 it is possible to adjust the connecting length along the longitudinal axis 17. In the present embodiment, the threaded shank 14 associated with the coupling hook 7 is provided with a groove 18 which extends parallel to the longitudinal axis 17.

To facilitate the rotation of the sleeve 8 there is provided an actuating lever 24. The actuating lever 24 is supported in a bearing block 19 which is designed to be U-shaped. The two legs of the bearing block 19 have been given the reference number 20, and each leg 20 is provided with a bore 21. The actuating lever 24 comprises a yoke shank 25 and a yoke-like end with yoke arms 26 connectable thereto. Additionaly, the yoke arms 26 are provided with bores 28. The other end of the yoke shank 25 comprises a support 27.

Figure 2:
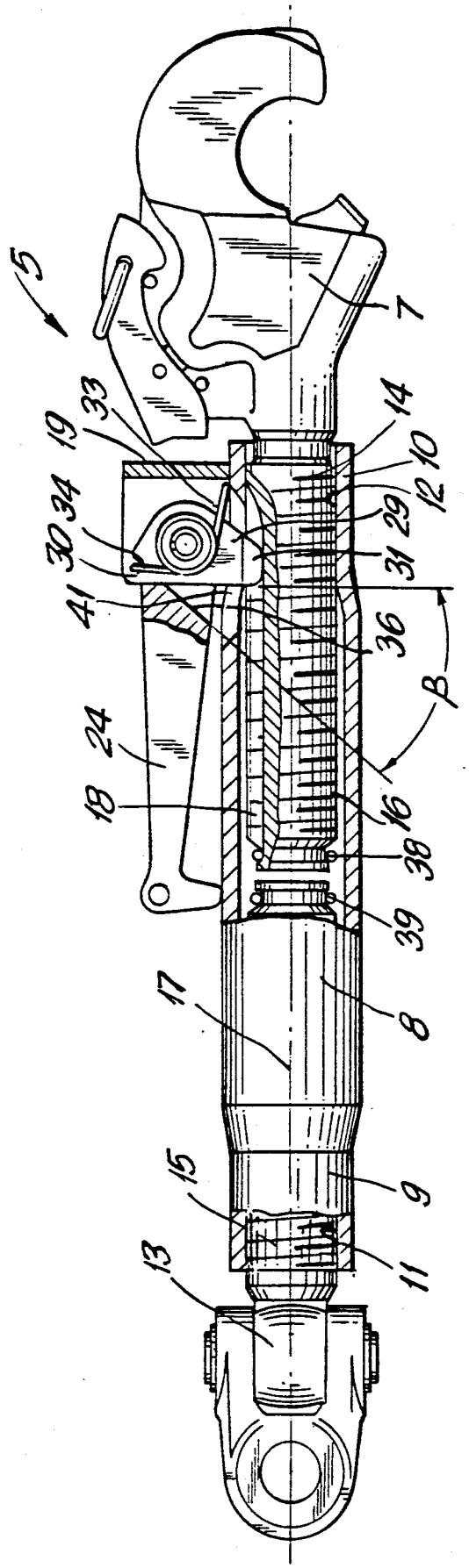
FIG. 2 is a lateral view of the upper steering arm, partially in section, with the locking ratchet in the locked position.
Figure 3:
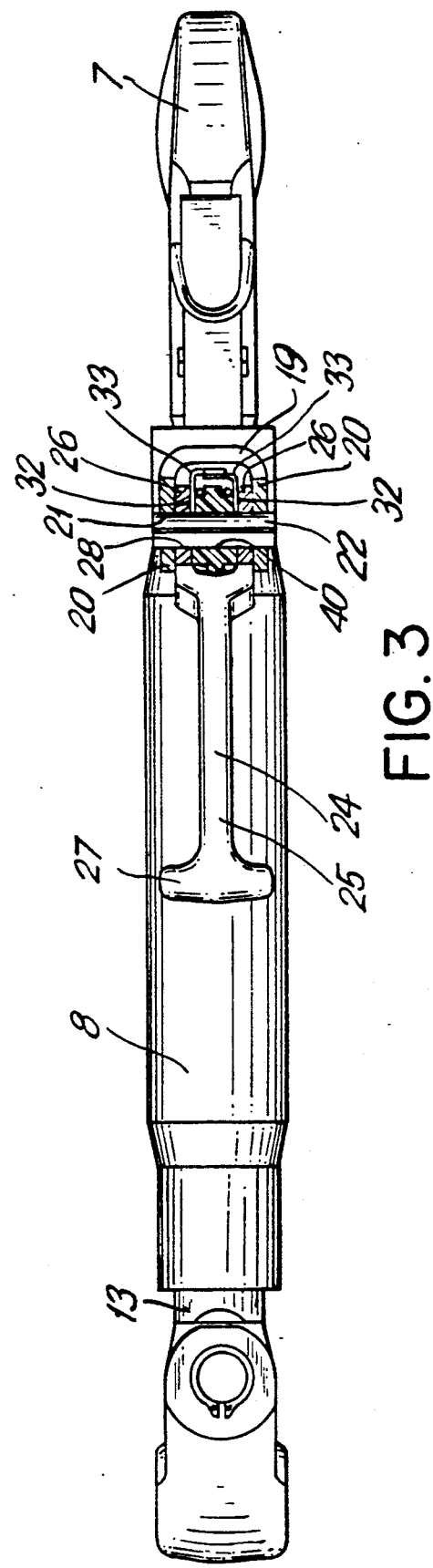
FIG. 3 is a plan view according to FIG. 2.
Figure 4:
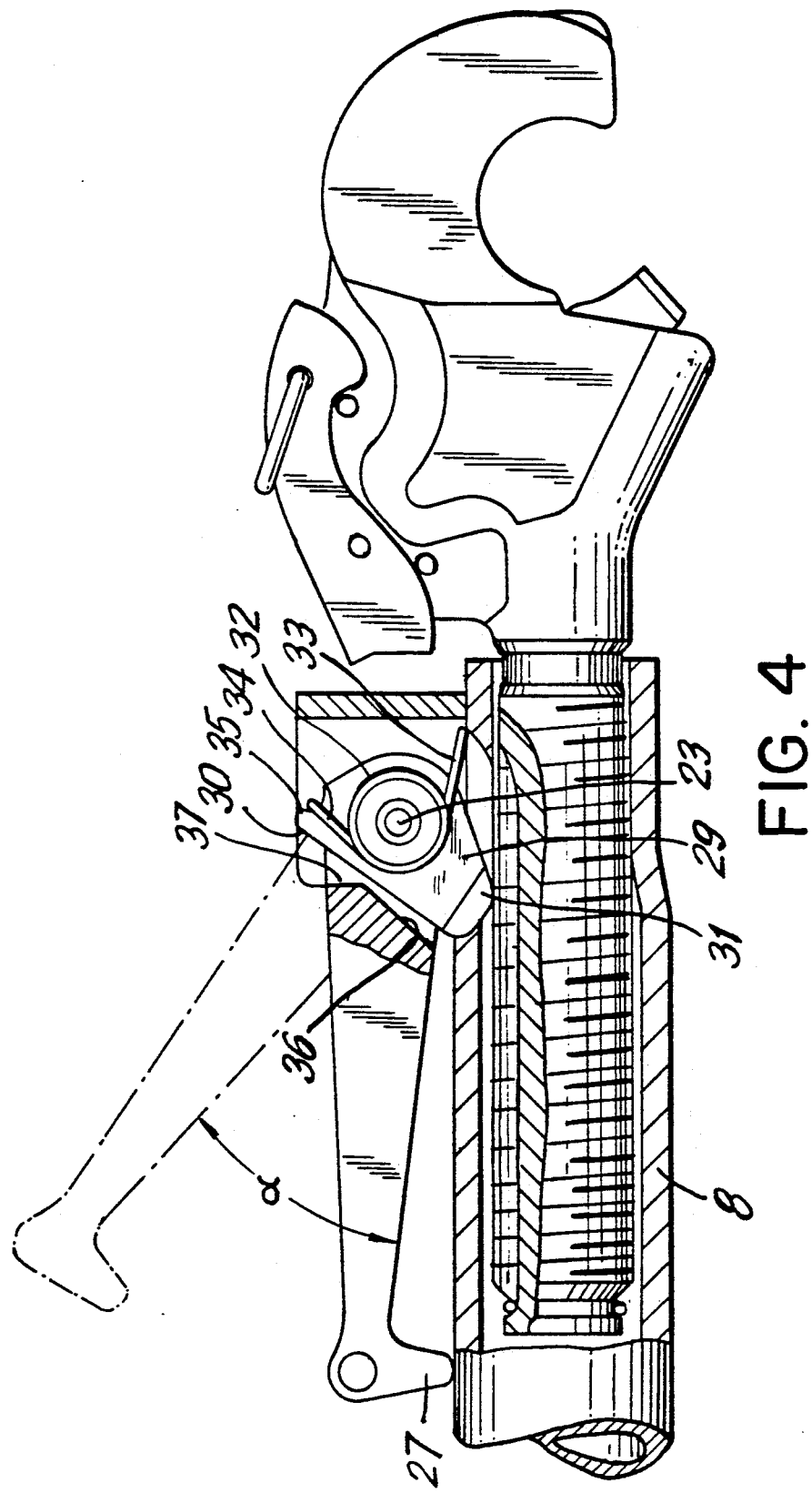
FIG. 4 shows a detail regarding the arrangement of the locking ratchet and the actuating lever, with the locking ratchet still being in the disengaged position.

Between the two yoke arms 26 there is received a locking ratchet 29. The locking ratchet 29 and the yoke arms 26 are provided with bores 28 and 40, respectively, which are designed to correspond to the bores 21 of the bearing block 19. A bearing pin 22 is inserted into these bores and comprises an axis 23 which forms the pivot axis for the actuating lever 24 and the locking ratchet 29. FIGS. 2 and 4 show that the locking ratchet 29 may be pivoted independently of the actuating lever 24. The locking ratchet 29 is loaded by at least one leg spring 32 whose first spring leg 33 is supported on the sleeve 8 or the bearing block 19 and whose second leg 34 engages a fillet 35 of the locking ratchet 29. The at least one leg spring 32 applies a moment to the locking ratchet 29 in the direction of the locked position as illustrated in FIG. 2. However, in the region of the yoke between the yoke arms 26, the inner face 36 of the actuating lever 24 is provided with a stop 37 which may be made to rest against the stop face 30 of the locking ratchet 29 and which, upon pivoting, starting from the position illustrated in FIG. 2, takes the locking ratchet 29 into the dash-dotted position shown in FIG. 4, which is the disengaged position.

It can be seen that the sleeve 8 is provided with an aperture 41 through which the locking ratchet 29 with its bolt portion 31 extends into the groove 18 of the threaded shank 14, thereby securing the sleeve 8 against rotation relative to the coupling hook 7. At the inner face 36 there is provided a free-floating angle β relative to the contact face 30 of the locking ratchet 29 if, as illustrated, the locking ratchet 29 rests with its stop face 30 against the stop 37 at the inner face 36. The size of the free-floating angle corresponds to the pivot angle α which is required for transferring the locking ratchet 29 from the locked position according to FIG. 2 into the disengaged position according to FIG. 4 and vice versa.

After the sleeve has been adjusted through being rotated and when locking is again required, the actuating lever 24 with its support 27 is moved so as to establish contact with the outer face of the sleeve 8. Unless the positions of the bolt portion 31 and of the groove 18 of the threaded shank 14 coincide accidentally, the locking ratchet 29 remains in its disengaged position in contact with the thread 16 of the threaded shank 14 until its position coincides with the groove 18, whereupon the locking ratchet 29, due to being loaded by the leg spring 32, with its bolt portion 31 may engage the groove 18. The actuating lever 24 cannot exert any forces on the locking ratchet 29 in the sense of causing it to enter the locked position. The actuating lever 24 only releases the locking ratchet to the extent that, under the force of the leg spring 32, it is able to enter the locked position automatically. Securing rings 39 inserted into grooves 38 prevent the threaded shanks 14, 15 from unintentionally being screwed out of the sleeve 8.

While the invention has been illustrated and described as embodiment in a length-adjustable upper steering arm for a three-point coupling device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A length-adjustable upper steering arm for a three-point coupling device for connecting agricultural implements to a tractor, comprising:
   a sleeve whose ends are internally provided with threaded bores whose threads extend in opposite directions;
   a connecting eye or coupling hook having a threaded shank with a thread corresponding to the threaded bores being screwed into the bores so as to be adjustable;
   with the sleeve being provided with a pivotable actuating lever;
   a locking ratchet movable for locking via the actuating lever through an aperture in the sleeve into a lengthwise groove in the threaded shank of the connecting eye or coupling hook, the actuating lever (24) and the locking ratchet (29) being supported on the sleeve (8) so as to be pivotable independently of each other at a free-floating angle (β), and a spring (32) arranged so as to load the locking ratchet (29) toward a locking position, the actuating lever (24), via a stop (37) resting against the locking ratchet (29) in the locking position, transferring the locking ratchet (29) into a disengaged position by pivoting it by a pivot angle (α).

2. An upper steering arm according to claim 1, wherein the free-floating angle (α) has an angular travel which corresponds to the pivot angle (α) which the locking ratchet (29) move through from the disengaged position into the locking position.

3. An upper steering arm according to claim 1, wherein the actuating lever (24) and the locking ratchet (29) are jointly supported in a U-shaped bearing block (19) which is attached to the sleeve (8).

4. An upper steering arm according to claim 1, wherein the actuating lever (24) is a yoke shank (25) with one end to be supported being yoke-like and having yoke arms (26), the locking ratchet (29) being received between the yoke arms (26), and the locking ratchet (29) and actuating lever (24) being supported together in a bearing block (19) via a pin (22).

5. An upper steering arm according to claim 3, wherein the actuating lever (24) is a yoke shank (25) with one end to be supported being yoke-like and having yoke arms (26), the locking ratchet (29) being received between the yoke arms (26), and the locking ratchet (29) and actuating lever (24) being supported together in a bearing block (19) via a pin (22).

6. An upper steering arm according to claim 1, wherein the spring (32) is a leg spring having one spring leg (33) which is supported on the sleeve (8), and another spring leg (34) supported on the locking ratchet (29).

7. An upper steering arm according to claim 6, and further comprising a second spring, the spring legs (34) of both springs (32) being supported on the locking ratchet (29).

8. An upper steering arm according to claim 4, wherein the stop (37) is arranged at an inner face (36) of the yoke shank (25) between the two yoke arms (26).

9. An upper steering arm according to claim 5, wherein the stop (37) is arranged at an inner face (36) of the yoke shank (25) between the two yoke arms (26).

10. An upper steering arm according to claim 1, wherein the actuating lever (24) and the locking ratchet (29) have a pivot axis (23) which extends transversely to the longitudinal axis (17) of the sleeve 8.

* * * * *